(12) United States Patent
Huelke et al.

(10) Patent No.: US 9,834,069 B2
(45) Date of Patent: Dec. 5, 2017

(54) SUN VISOR ASSEMBLY FOR MOTOR VEHICLES WITH PIVOTING MIRROR

(71) Applicant: FORD GLOBAL TECHNOLOGIES, LLC, Dearborn, MI (US)

(72) Inventors: David Huelke, Milan, MI (US); Justin Lee Healy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 215 days.

(21) Appl. No.: 14/804,888

(22) Filed: Jul. 21, 2015

(65) Prior Publication Data
US 2017/0021704 A1    Jan. 26, 2017

(51) Int. Cl.
*B60J 3/02*    (2006.01)
(52) U.S. Cl.
CPC ........... *B60J 3/0282* (2013.01); *B60J 3/0204* (2013.01)
(58) Field of Classification Search
CPC ......... B60J 1/20; B60J 3/00; B60J 3/02; B60J 3/0204; B60J 3/0282
USPC .................................. 296/97.1, 97.5, 97.12
See application file for complete search history.

(56) References Cited

U.S. PATENT DOCUMENTS

| | | | |
|---|---|---|---|
| 4,635,994 A * | 1/1987 | Dietz | B60J 3/0282 16/361 |
| 4,807,093 A | 2/1989 | Cisler | |
| 4,934,802 A | 6/1990 | Fluharty et al. | |
| 5,061,004 A | 10/1991 | Happich et al. | |
| 5,528,470 A | 6/1996 | White | |
| 5,975,708 A * | 11/1999 | Fitzpatrick | B60J 3/0282 296/97.1 |
| 6,203,161 B1 | 3/2001 | Busch et al. | |
| 6,264,352 B1 | 7/2001 | Zapinski | |
| 7,118,156 B2 * | 10/2006 | Iwatsuka | B60J 3/0282 296/97.2 |
| 8,215,696 B2 * | 7/2012 | Akiya | B60J 3/0204 160/370.21 |
| 2013/0016429 A1* | 1/2013 | Li | B60R 1/008 359/602 |

* cited by examiner

*Primary Examiner* — Jason S Daniels
(74) *Attorney, Agent, or Firm* — Vichit Chea; King & Schickli, PLLC

(57) ABSTRACT

A sun visor assembly is provided. The sun visor assembly includes a support, a visor body carried on the support and a mirror carried on the visor body. The visor body pivots about a first axis in a first plane and the mirror pivots about a second axis in a second plane where the first axis is substantially perpendicular to the second axis. Thus the mirror is effectively provided with two degrees of freedom allowing it to be more conveniently, efficiently and effectively adjusted.

16 Claims, 5 Drawing Sheets

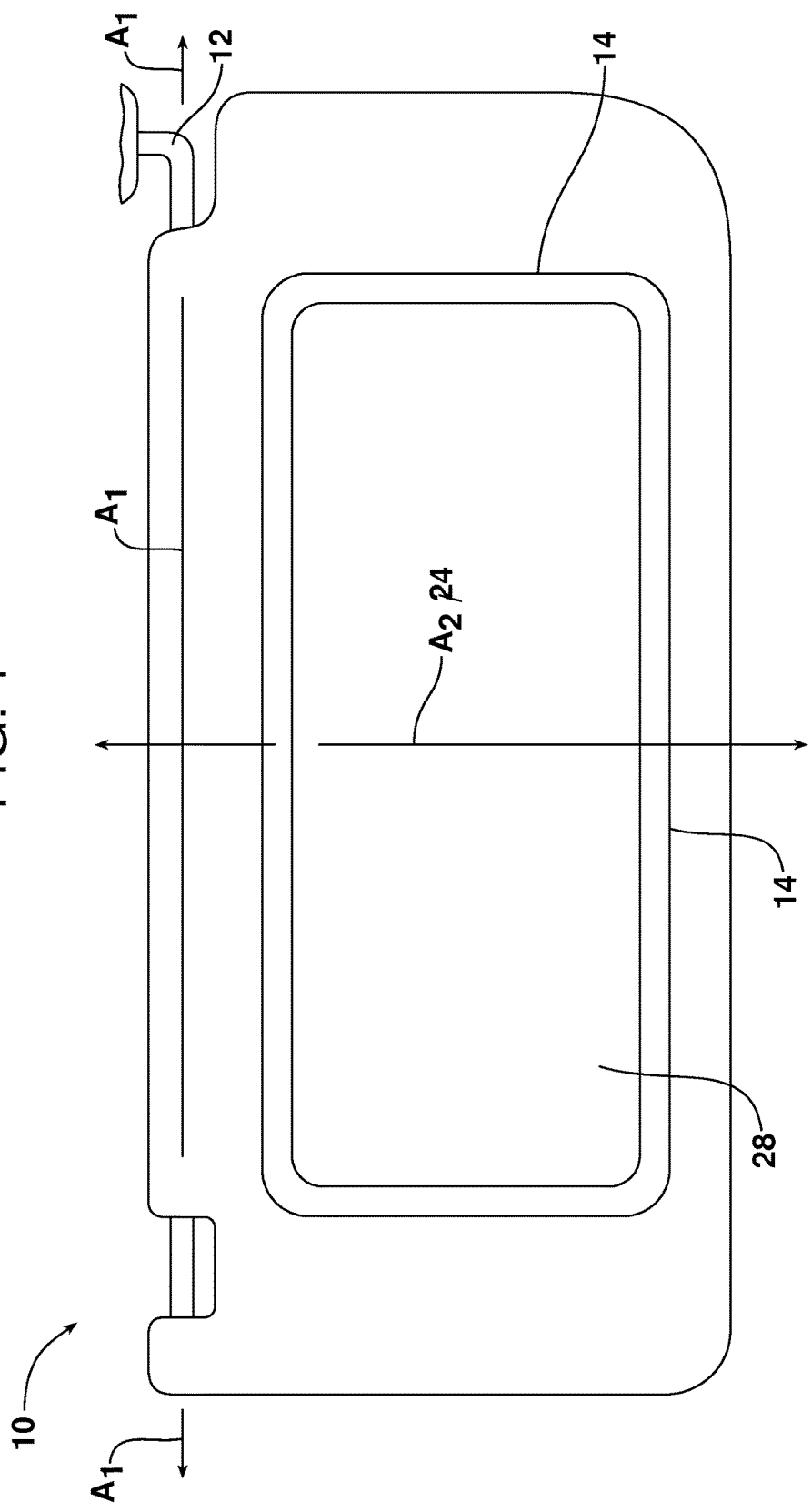

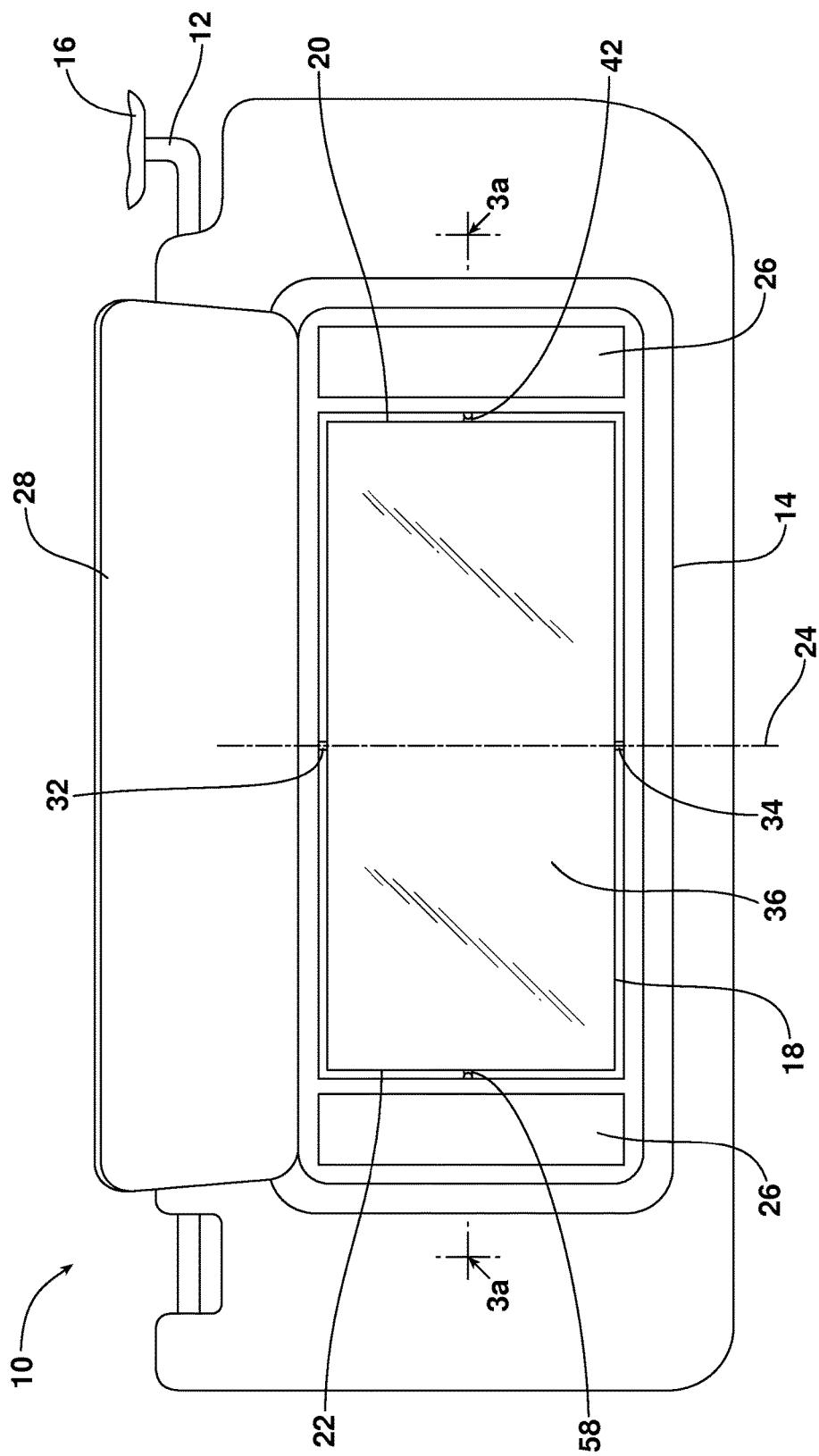

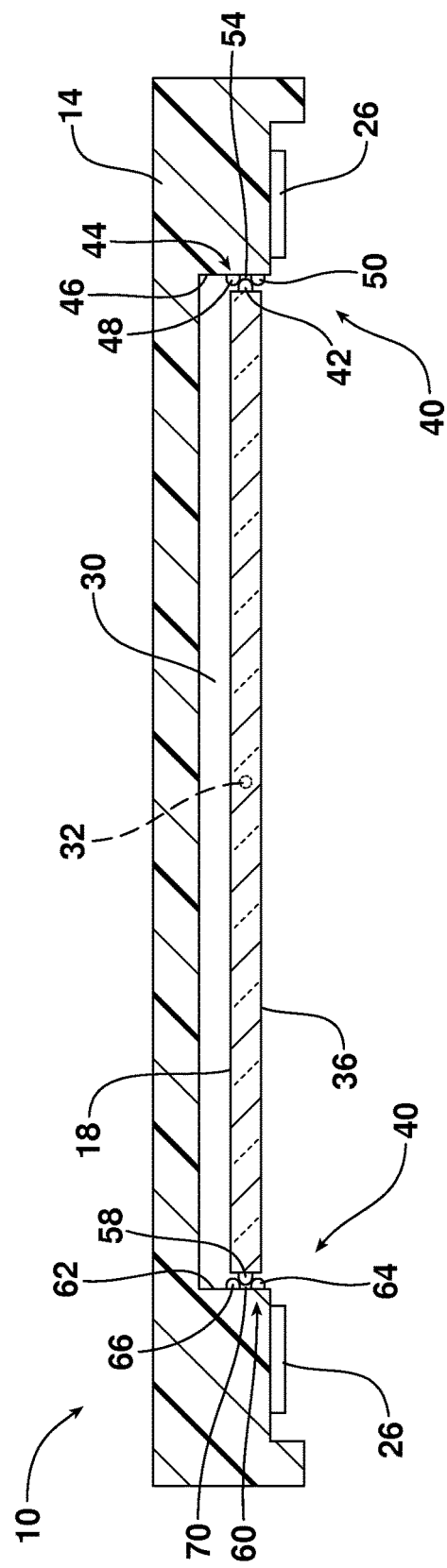

SUN VISOR ASSEMBLY FOR MOTOR VEHICLES WITH PIVOTING MIRROR

TECHNICAL FIELD

This document relates generally to the motor vehicle equipment field and, more particularly, to a sun visor assembly incorporating a pivoting mirror.

BACKGROUND

It is well known in the art to provide a sun visor assembly in a motor vehicle. It is similarly well-known to equip such a sun visor assembly with a vanity mirror.

Many vehicles today incorporate large sweeping roof lines at the windshield area. As a result, the mirror on the visor may be provided at an angle to the user making it difficult for the user to have a full view of their face in the mirror. This document relates to a new and improved sun visor assembly incorporating a pivoting mirror, thereby effectively providing for mirror adjustment with two degrees of freedom. This makes it much easier for a user to align the mirror as desired.

SUMMARY

In accordance with the purposes and benefits described herein, a sun visor assembly is provided for a motor vehicle. That sun visor assembly comprises a support, a visor body carried on the support and a mirror on the visor body. The visor body pivots about a first axis in a first plane and, additionally, the mirror pivots about a second axis in a second plane where the first plane is substantially perpendicular to the second plane. Thus, it should be appreciated that the mirror effectively has adjustment with two degrees of freedom so that it may be more conveniently and effectively aligned as desired by the user.

In one possible embodiment, the first axis is coextensive with at least a portion of the support. In one possible embodiment, the second axis is on a centerline of the mirror. A first pivot pin connects the mirror to the visor body and the first pivot pin defines the second axis.

In another possible embodiment, a second pivot pin connects the mirror to the visor body. In this embodiment, the first and second pivot pins are coaxial and define the second axis.

Still further describing the sun visor assembly, the mirror includes a reflective face having a first end and a second end opposite the first end. The centerline is equally spaced from the first end and the second end of the mirror. Further, the mirror is displaceable between (a) a centered position, (b) a first angled position wherein the reflective face of the mirror is pivoted toward the first end and (c) a second angled position wherein the reflective face of the mirror is pivoted toward the second end.

The sun visor assembly also includes a mirror adjustment mechanism. The mirror adjustment mechanism includes a first interface projection at the first end of the mirror and a first cooperating guide on the visor body. The first guide includes a first notch, a second notch and a third notch. The first interface projection is received: (a) in the first notch when the mirror is in the first angled position; (b) in the second notch when the mirror is in the centered position and (c) in the third notch when the mirror in the second angled position.

Still further, the first guide includes a first nubbin between the first notch and the second notch and a second nubbin between the second notch and the third notch.

Still further, in one possible embodiment, the mirror adjustment mechanism includes a second interface projection at the second end of the mirror and a second cooperating guide on the visor body. That second guide includes a fourth notch, a fifth notch and a sixth notch, and the second interface projection is received: (a) in the fourth notch when the mirror is in the first angled position; (b) in the fifth notch when the mirror is in the centered position and (c) in the sixth notch when the mirror is in the second angled position.

Still further, the second guide includes a third nubbin between the fourth notch and the fifth notch and a fourth nubbin between the fifth notch and the sixth notch.

In one possible embodiment, the sun visor assembly also includes a hinged cover overlying the mirror. In still another possible embodiment, a light source is provided adjacent the mirror. In one possible embodiment, that light source is provided on the visor body outboard of the first end and the second end of the mirror. In still another possible embodiment, the visor body includes a cavity between the light source outboard the first and second ends of the mirror, and the mirror is received in that cavity.

In the following description, there are shown and described several preferred embodiments of the sun visor assembly. As it should be realized, the sun visor assembly is capable of other, different embodiments and its several details are capable of modification in various, obvious aspects all without departing from the sun visor assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the sun visor assembly and together with the description serve to explain certain principles thereof. In the drawing figures:

FIG. 1 is a plan view of the rear face of the sun visor assembly with the hinged cover in the closed position.

FIG. 2 is a view similar to FIG. 1, showing the hinged cover pivoted upwardly into the open position to expose the mirror flanked by a light source at both ends.

Figure 3B:
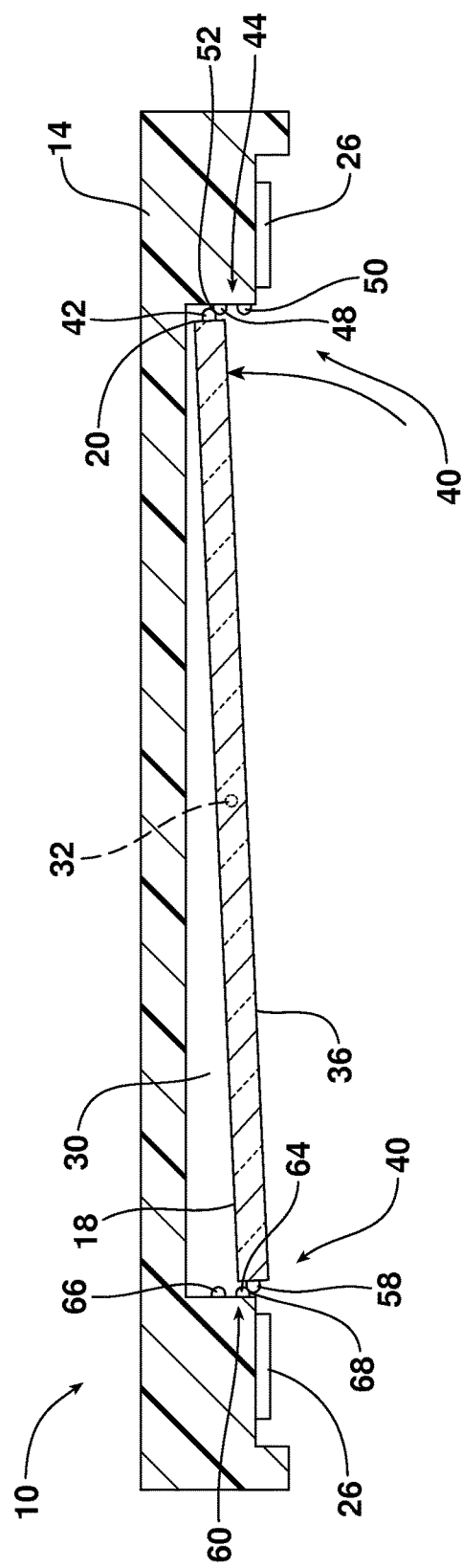
Figure 3C:
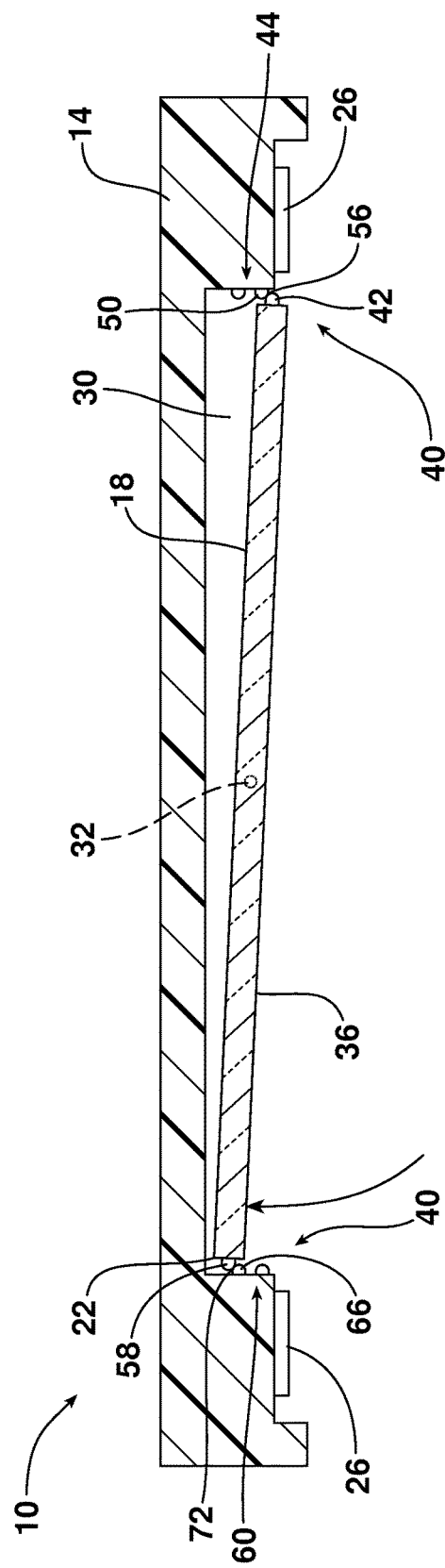

FIGS. 3*a*-3*c* are schematic cross-sectional views of the sun visor assembly illustrating the mirror in the respective centered, first angled and second angled positions.

Reference will now be made in detail to the present preferred embodiments of the sun visor assembly, examples of which are illustrated in the accompanying drawing figures.

DETAILED DESCRIPTION

Reference is now made to the drawing figures illustrating the sun visor assembly 10 that is the subject matter of this document. As illustrated, the sun visor assembly 10 includes a support in the form of a rod 12 that connects the visor body 14 to the motor vehicle at the connection point 16. As illustrated in FIGS. 2 and 3*a*-3*c*, a mirror 18 is carried on the visor body 14. The mirror 18 includes a first end 20, a second end 22 and a centerline 24 equally spaced from the first and second ends. As further illustrated, a light source 26 in the form of dual lamps is carried on the visor body 14 outboard the first and second ends 20, 22 of the mirror 18. A hinged cover 28 overlies the mirror 18 and the light source 26 when in the closed position illustrated in FIG. 1. One opens the cover 28 by hinging it upwardly in order to reveal the mirror 18 and the light source 26 as illustrated in FIG. 2. It should be appreciated that the light source 26 may be activated by means of a switch or other control mechanism engaged by the hinged cover 28 as is known in the art.

The visor body 14 pivots about a first axis $A_1$ in a first plane, and the mirror 18 pivots about a second axis $A_2$ in a second plane, where the first axis is substantially perpendicular to the second axis (see FIG. 1). In the illustrated embodiment, the first axis $A_1$ is coextensive with at least a portion of the support 12 to which the visor body 14 is pivotally connected. In contrast, the second axis $A_2$ is aligned with the centerline 24 of the mirror 18 (see FIG. 2).

As illustrated in FIGS. 3a-3c, the visor body 14 includes a cavity 30 and the mirror 18 is received in that cavity between the outboard light source/lamps 26. A first pivot pin 32 connects the mirror 18 to the visor body 14 along a first edge of the mirror 18. This first pivot pin 32 defines the second axis $A_2$.

As illustrated in FIG. 2, a second pivot pin 34 connects the mirror 18 to the visor body 14 along a second edge opposite the first pivot pin 32. In this embodiment, the two pivot pins 32, 34 are coaxial and both define the second axis $A_2$. Of course it should be appreciated that a single pivot pin may extend through both opposed edges if desired.

As best illustrated in FIGS. 3a-3c, the mirror 18 is pivotally displaceable about the second axis $A_2$ at the centerline 24 between the centered position illustrated in FIG. 3a, the first angled position illustrated in FIG. 3b and the second angled position illustrated in FIG. 3c. More specifically, as illustrated respectively in FIGS. 3b and 3c, in the first angled position the reflective face 36 of the mirror 18 is pivoted toward the first end 20 while in the second angled position the reflective face is pivoted toward the second end 22.

In the illustrated embodiment, the position of the mirror 18 is positively maintained by the mirror adjustment mechanism, generally designated by reference number 40. More specifically, the mirror adjustment mechanism 40 includes a first interface projection 42 at the first end 20 of the mirror 18. A first cooperating guide 44 is provided on the visor body 14 and more specifically, the wall 46 of the cavity 30. The first cooperating guide 44 includes a first nubbin 48 and a second nubbin 50 defining a first notch 52, a second notch 54 and a third notch 56. More specifically, the first nubbin 48 is provided between the first and second notches 52, 54 while the second nubbin 50 is provided between the second and third notches 54, 56. See the detailed view of the first interface projection 42 presented in FIG. 4.

In the illustrated embodiment, a second interface projection 58 is provided at the second end 22 of the mirror 18. In addition, a second cooperating guide 60 is provided on the visor body 14 and, more particularly, the wall 62 of the cavity 30. The second cooperating guide 60 is similar to the first cooperating guide 44 in that it includes a third nubbin 64 and a fourth nubbin 66 defining fourth, fifth and sixth notches 68, 70, 72. More specifically, the third nubbin 64 is provided between the fourth and fifth notches 68, 70 while the fourth nubbin 66 is provided between the fifth and sixth notches 70, 72.

As best illustrated in FIG. 3a, when the mirror 18 is in the centered position, the first interface projection 42 is received in the second notch 54 while the second interface projection 58 is received in the fifth notch 70. When the mirror 18 is in the first angled position illustrated in FIG. 3b, the first interface projection 42 is received in the first notch 52 while the second interface projection 58 is received in the fourth notch 68. In contrast, when the mirror 18 is in a second angled position illustrated in FIG. 3c, the first interface projection 42 is received in the third notch 56 while the second interface projection 58 is received in the sixth notch 72.

As should be appreciated, the interface projections 42, 58 and the nubbins 48, 50, 64, 66 all include rounded ends which function to allow the interface projections 42, 58 to snap past the nubbins 48, 50, 64, 66 when one desires to adjust the mirror 18 between the three positions illustrated in FIGS. 3a-3c. Only a small force needs to be applied. At other times the interference between the interface projections 42, 58 and nubbins 48, 50, 64, 66 functions to hold the mirror 18 in the desired or selected position.

As should be appreciated, a user may adjust the position of the mirror 18 including, particularly, the reflective face 36 with two degrees of freedom. More specifically, the user may pivot the visor body 14 about the support 12 along the first axis $A_1$ thereby adjusting the mirror 18 carried on the visor body about the first axis in the first plane. Additionally, a user may adjust the mirror 18 about the second axis $A_2$ along the centerline 24 of the mirror in a second plane. This allows the user to better adjust the position of the reflective face 36 of the mirror 18 for use in a more efficient and effective manner.

The foregoing has been presented for purposes of illustration and description. It is not intended to be exhaustive or to limit the embodiments to the precise form disclosed. Obvious modifications and variations are possible in light of the above teachings. For example, the sun visor assembly 10 may only include a mirror adjustment mechanism 40 at one end of the mirror 18 rather than both ends as illustrated. Further, the mirror adjustment mechanism 40 provided may include more than two nubbins 48, 50 or 64, 66 and more than three notches 52, 54, 56 or 68, 70, 72 to allow for additional mirror retention and orientation positions. All such modifications and variations are within the scope of the appended claims when interpreted in accordance with the breadth to which they are fairly, legally and equitably entitled.

What is claimed:

1. A sun visor assembly for a motor vehicle, comprising:
   a support;
   a visor body carried on said support;
   a mirror carried on said visor body;
   a first pivot pin connecting said mirror to said visor body; and
   a second pivot pin connecting said mirror to said visor body,
   wherein said visor body pivots about a first axis in a first plane and said mirror pivots about a second axis in a second plane where said first axis is substantially perpendicular to said second axis, wherein said second axis is coextensive with a centerline of said mirror, and wherein said first pivot pin and said second pivot pin are coaxial and define said second axis.

2. The sun visor assembly of claim 1, wherein said first axis is coextensive with at least a portion of said support.

3. The sun visor assembly of claim 2, wherein said mirror includes a reflective face having a first end, a second end opposite said first end.

4. The sun visor assembly of claim 3, wherein said centerline is equally spaced from said first end and said second end of said mirror.

5. The sun visor assembly of claim 4, wherein said mirror is displaceable between a centered position, a first angled position wherein said reflective face of said mirror is pivoted toward said first end and a second angled position wherein said reflective face of said mirror is pivoted toward said second end.

6. The sun visor assembly of claim 5, further including a mirror adjustment mechanism.

7. The sun visor assembly of claim 6, wherein said mirror adjustment mechanism includes a first interface projection at said first end of said mirror and a first cooperating guide on said visor body.

8. The sun visor assembly of claim 7, wherein said first cooperating guide includes a first notch, a second notch and a third notch, said first interface projection being received: (a) in said first notch when said mirror is in said first angled position; (b) in said second notch when said mirror is in said centered position and (c) in said third notch when said mirror is in said second angled position.

9. The sun visor assembly of claim 8, wherein said first guide includes a first nubbin between said first notch and said second notch and a second nubbin between said second notch and said third notch.

10. The sun visor assembly of claim 9, wherein said mirror adjustment mechanism includes a second interface projection at said second end of said mirror and a second cooperating guide on said visor body.

11. The sun visor assembly of claim 10, wherein said second guide includes a fourth notch, a fifth notch and a sixth notch, said second interface projection being received: (a) in said fourth notch when said mirror is in said first angled position; (b) in said fifth notch when said mirror is in said centered position and (c) in said sixth notch when said mirror is in said second angled position.

12. The sun visor assembly of claim 11, wherein said second guide includes a third nubbin between said fourth notch and said fifth notch and a fourth nubbin between said fifth notch and said sixth notch.

13. The sun visor assembly of claim 12, further including a hinged cover overlaying said mirror.

14. The sun visor assembly of claim 13, further including a light source adjacent said mirror.

15. The sun visor assembly of claim 14, wherein said light source is provided on said visor body outboard of said first end and said second end of said mirror.

16. The sun visor assembly of claim 15, wherein said visor body includes a cavity between said light source outboard said first end and said second end of said mirror and said mirror is received in said cavity.

* * * * *